(12) United States Patent
Herrmann et al.

(10) Patent No.: US 9,169,563 B2
(45) Date of Patent: Oct. 27, 2015

(54) METHOD FOR FORMING AN ALUMINOSILICATE-ZEOLITE LAYER ON A METAL SUBSTRATE, THE COATED SUBSTRATE AND THE USE THEREOF

(75) Inventors: Ralph Herrmann, Halle (DE); Wilhelm Schwieger, Spardorf (DE); Jurgen Bauer, Lichtenfels (DE)

(73) Assignee: Sortech AG, Halle (Saale) (DE)

( * ) Notice: Subject to any disclaimer, the term of this patent is extended or adjusted under 35 U.S.C. 154(b) by 873 days.

(21) Appl. No.: 13/254,057

(22) PCT Filed: Mar. 1, 2010

(86) PCT No.: PCT/EP2010/001255
§ 371 (c)(1),
(2), (4) Date: Jan. 13, 2012

(87) PCT Pub. No.: WO2010/099919
PCT Pub. Date: Sep. 10, 2010

(65) Prior Publication Data
US 2012/0108415 A1    May 3, 2012

(30) Foreign Application Priority Data

Mar. 3, 2009    (DE) .................... 10 2009 011 530

(51) Int. Cl.
C23C 18/00    (2006.01)
B01J 20/18    (2006.01)
C23C 18/12    (2006.01)
(Continued)

(52) U.S. Cl.
CPC ........... C23C 18/1212 (2013.01); B01J 20/165 (2013.01); B01J 20/3238 (2013.01); B01J 29/06 (2013.01); C23C 22/66 (2013.01)

(58) Field of Classification Search
CPC ...... C23C 18/1212; C23C 22/66; B01J 20/16; B01J 20/165; B01J 20/3238; B01J 29/06
See application file for complete search history.

(56) References Cited

U.S. PATENT DOCUMENTS 4,851,605 A * 7/1989 Bortinger et al. ............. 585/640
5,310,714 A    5/1994 Grasselli et al.
(Continued)

FOREIGN PATENT DOCUMENTS

CN    1335821 A    2/2002
CN    101242892 A    8/2008
(Continued)

OTHER PUBLICATIONS

English translation of First Office Action issued in Chinese Patent Application No. 201080013499.X dated Jan. 30, 2013, 9 pages.
(Continued)

*Primary Examiner* — Lois Zheng
(74) *Attorney, Agent, or Firm* — Morgan, Lewis & Bockius, LLP

(57) ABSTRACT

A method is described for forming an aluminosilicate-zeolite layer on an aluminum-containing substrate by in situ direct crystallization. Aluminum-rich aluminosilicate-zeolite coatings on aluminum-containing metal substrates obtained by this method are advantageous, for example, in sorption-based fields of application, such as heterogeneous catalysis, in separation and cleaning processes, in sorption heat pumps, in conjunction with immobilized catalysts and in microreaction technology.

18 Claims, 5 Drawing Sheets

(XRD reflexes of the untreated aluminium carrier and the reflexes of the carriers after 96 h and 163 h reaction time)

(Comparison of the reflexes of the product after 163 h with zeolite P2, ICDD Data Bank, PDF Number 80-0700)

(51) Int. Cl.
*B01J 20/16* (2006.01)
*B01J 20/32* (2006.01)
*B01J 29/06* (2006.01)
B01J 37/08 (2006.01)
C23C 22/66 (2006.01)

(56) References Cited

U.S. PATENT DOCUMENTS

2003/0091872 A1* 5/2003 Yan .............................. 428/702
2005/0079994 A1 4/2005 Oki et al.
2006/0093806 A1 5/2006 Yan et al.
2010/0136326 A1 6/2010 Wolf et al.

FOREIGN PATENT DOCUMENTS

DE 102005038044 2/2007
EP 0753485 * 1/1997 ............. C01B 39/02
JP 07330326 H 12/1995

OTHER PUBLICATIONS

International Preliminary Report on Patentability (English translation) for International Patent Application No. PCT/EP2010/001255, dated Sep. 5, 2011, 6 pages.

International Search Report (English translation) for International Patent Application No. PCT/EP2010/001255, dated Sep. 30, 2010, 2 pages.

Publication for International Patent Application Na PCT/EP2010/001255, dated Sep. 10, 2010, 22 pages.

Notification of Reasons for Refusal, Issued Japanese Patent Applicaiton No. 2011-552355 on Feb. 28, 2014.

* cited by examiner (XRD reflexes of the untreated aluminium carrier and the reflexes of the carriers after 96 h and 163 h reaction time)

(Comparison of the reflexes of the product after 163 h with zeolite P2, ICDD Data Bank, PDF Number 80-0700)

(SEM micrographs of the crystal layer after 163 h in top view)

(SEM micrographs of the crystal layer after 163 h in cross-section. The circle marks the point of the EDX measurement in the zeolite layer)

(EDX spectrum of the crystal layer after 163 h)

(XRD reflexes of the untreated aluminium carrier and the reflexes of the carriers after 96 h and 163 h reaction time)

(Comparison of the reflexes of the product after 163 h with zeolite P1, ICDD Data Bank, PDF Number 71-0962)

(SEM micrographs of the crystal layer after 163 h in top view)

(SEM micrographs of the crystal layer after 163 h in cross-section. The circle marks the point of the EDX measurement in the zeolite layer)

(EDX spectrum of the crystal layer after 163 h)

METHOD FOR FORMING AN ALUMINOSILICATE-ZEOLITE LAYER ON A METAL SUBSTRATE, THE COATED SUBSTRATE AND THE USE THEREOF

CROSS-REFERENCE TO RELATED APPLICATIONS

This application is a National Stage Application of International Application No. PCT/EP2010/001255, filed on Mar. 1, 2010 and published in German language, which claims priority benefit from DE 10 2009 011 530.7 filed Mar. 3, 2009, now expired, each of which are incorporated herein by reference in their entirety.

The invention relates to a method for forming an aluminosilicate-zeolite layer on an aluminium-containing metal substrate, which is introduced into an aqueous reaction dispersion in which silicon and optionally aluminium are contained as network-forming elements, wherein, irrespective of whether or not aluminium is present in the aqueous reaction dispersion, the molar ratio between the aluminium in the aqueous reaction dispersion, optionally 0, to the sum of the designated network-forming elements contained in the aqueous reaction dispersion lies between 0 and about 0.4, the aqueous reaction dispersion containing the aluminium-containing metal substrate is heated and aluminium is extracted from the aluminium-containing metal substrate for the aluminosilicate-zeolite formation process and the layer of an aluminosilicate-zeolite is formed on the aluminium-containing substrate by in situ direct crystallization. The invention further relates to advantageous applications of the product of the method.

Moreover, the invention relates to the product obtained by this method in the form of an aluminium-containing substrate, on which an aluminosilicate-zeolite layer is formed which is rich in aluminium, and advantageous applications of this aluminium-containing substrate.

In the closer mineralogical sense, zeolites are silicate minerals and especially aluminosilicates of complex chemical structure, which are characterized by the formation of porous tetrahedron networks (T-networks). According to the more general definition of the IZA (International Zeolite Association), zeolites are understood to be those metals which have T-networks of a network density of <19 T-atoms per 1000 Å$^3$. They display a structure with inner cavities which can assume molecular values. This produces the characteristic of zeolites of being able to receive foreign atoms or respectively foreign molecules into their porous structure. For example, zeolites can store large quantities of water and can release this again on heating. Zeolites are especially suitable for heat transformation in contact with a heat exchanger. For this, according to an earlier prior art, either fills of shaped zeolites are used or zeolites which are introduced into open-pored solid bodies which are in thermal contact with a heat exchanger. Such a prior art can be seen for example from DE 101 59 652 C2.

In addition, zeolites are used in the chemical industry for a variety of further applications. These are, for example, ion exchange processes, wherein zeolites which are generally produced synthetically are used in powder form having a crystal size of a few micrometers. In addition, zeolites are used as molecular sieves, in which the zeolites can be introduced into a filter system as a loose fill of crystals or of shaped materials.

In applications in which heat is supplied to zeolites or respectively in which heat is to be extracted therefrom, loose zeolite fills are therefore unsuitable, because only an insufficient thermal contact to the adjoining heat exchanger structures can be achieved. In addition, especially for adsorption applications, the working medium, which is usually designated as sorptive, must be supplied in an effective manner to the zeolite as sorbent material. Therefore for such applications the zeolite, which is synthesized as a powder, is shaped into pellets by means of a binding agent. However, the characteristics of the zeolites which are relevant to the application are affected by the majority of binding agents in a disadvantageous manner. In addition, with the use of pellets a sufficient thermal contact to adjoining heat exchangers can not be guaranteed. Therefore, systems of heat exchangers are proposed, onto which a layer of a zeolite is applied. For the known coating methods of substrates with zeolites, the two-stage procedure is typical. Here, firstly a zeolite powder is synthesized which can be aftertreated mechanically, thus through crushing or grinding steps, whereby a pulverulent zeolite having a preset particle size is produced. The zeolite material which is synthesized or pre-synthesized in such a way is generally mixed with a binding agent and then applied as a "coating" onto the carrier substrate. A disadvantage in the described procedure is that the applying of uniformly thick zeolite layers on the total surface of the heat exchanger, especially in the case of complex, three-dimensional heat exchanger structures, is difficult. In addition, such a post-synthetic coating method has a disadvantageously large number of production steps. In addition, the majority of conventional binding agents influence the relevant characteristics of the zeolites, because the binding molecules and particles accumulate on the surface of the zeolite crystals. Also, the heat conduction which is able to be achieved in the zeolite layer and from the zeolite layer to the substrate is still too little.

US 2003/0091872 A1 describes a method for the production of a zeolite layer on a metal, such as aluminium, nickel, steel or titanium. Conventional aluminium silicate layers are formed hereon in an aqueous reaction dispersion having a pH value of neutral to 12. The reaction dispersion also contains aluminium. By a direct growth of the zeolites onto the substrate (in situ crystallization), the adhesion of the zeolite layer on the substrate is improved. The Si and Al sources in the solution provide the structural elements for the aluminosilicate-zeolites which are to be formed on the substrate. In the case of an aluminium-containing metal substrate, some aluminium atoms of the substrate can also be incorporated into the aluminosilicate-zeolite network.

A very interesting proposal of forming a layer of an aluminosilicate-zeolite on an aluminium-containing metal substrate can be seen from WO 2006/08421 A2. This prior art goes beyond that which is presented above; here, work is carried out with a distinct aluminium substoichiometric value in the reaction dispersion. In addition, it is also imperatively required that in the formation of the zeolite layer on the aluminium-containing substrate, phosphorus is contained as network-forming element in the aqueous reaction dispersion into which the aluminium-containing metal substrate is introduced. Hereby, aluminium phosphate-zeolites are formed, which can be supplied to advantageous applications.

Several attempts were made to also grow aluminosiliceous zeolites directly onto metallic carriers, such as stainless steel. Positive results were published for aluminium-poor zeolites (Type MFI). Here, the crystallization on the carrier is brought about through heterogeneous nucleation. A 3-stage variant with nucleant embedding into an MFI layer previously produced on steel and a subsequent growth phase for the aluminium-rich zeolite (cf. R. Monuz et al. Microporous and Mesoporous Materials 86 (2005), 243-248) and a crystallization on steel, which had a distinctly enlarged surface by pre-treatments (cf. L. Bonaccorsi, E. Proverbio, Microporous and Mesoporous Materials, 74 (2004), 221-229) is described as a successful method for aluminium-rich aluminosilicates. Aluminium especially is of interest as a carrier material, because this also represents a network-forming element of the zeolites, is light and has a very good thermal conductivity. Hitherto, using an aluminium substoichiometric value, only the aluminium-poor zeolite type MFI (Si/Al ratio of $NH_3$-TPD measurements 15-16) was able to be produced with aluminium (cf. F. Scheffler et al. Microporous and Mesoporous Materials 67 (2004) 53-59). The conversion of these experiments to aluminium-rich zeolite layers in the sense of the invention lead to the uncontrolled decomposition of the aluminium-containing substrate.

The invention was therefore based on the aim of further developing the prior art described in the introduction such that an advantageous layer of an aluminium-rich aluminosilicate-zeolite can be formed on an aluminium-containing metal substrate without limiting the possibilities for application of the coated substrate. A good adhesion between the zeolite layer and the aluminium-containing metal substrate is also to be achieved here. This is to become possible through a simple conducting of the method and with few method steps.

According to the invention, this aim is addressed by a method of the type described in the introduction, in that a layer of an aluminium-rich aluminosilicate-zeolite having an Si/Al ratio of lower than 5 is formed on the aluminium-containing metal substrate by introducing into the aqueous reaction dispersion a Si source in an amount sufficient for forming the Si/Al ratio of lower than 5, and an Al source that meets the requirement of the molar substoichiometric value, and the aluminium-containing metal substrate, wherein the pH value of the aqueous reaction dispersion is alkalinized and the layer of the aluminium-rich aluminosilicate-zeolite is crystallized onto the aluminium-containing metal substrate.

If, within the scope of the present invention, a layer of an aluminium-rich aluminosilicate-zeolite is formed on an aluminium-containing metal substrate, this is to be understood in the widest possible extent. The following aluminium-rich aluminosilicate-zeolites are to be highlighted only by way of example, albeit preferably: FAU (zeolite X and Y), LTA, CHA, MOR and GIS. These preferred aluminium-rich aluminosilicate-zeolites fulfil the further requirement in accordance with the invention, that the Si/Al ratio therein is less than 5. It is preferred that this ratio is smaller than 4, especially smaller than 3.5. The Si/Al ratio can lead up to a value of 1, which as a matter of principle can not be fallen below. These zeolites are distinguished by a water sorption capacity at 25° C. of at least 12% or more, in relation to the pure mass of the zeolite, and by IUPAC Type I equilibrium isotherms for water vapour (cf. Sing et al, Pure Appl. Chem. 57 (1985) p. 603) and are to be associated with the hydrophilic "Group 1" adsorbent materials in accordance with Rodrizez-Reinoso et al. (cf. Rodrizez-Reinoso et al. Studies in Surface Science and Catalysis 62 (1991) p. 685-692). A higher proportion of aluminium generally leads to a more secure adhesion of the formed zeolite layer on the aluminium-containing substrate.

The aim of the invention, as presented, is to form a layer of an aluminium-rich aluminosilicate-zeolite of the designated requirements on an aluminium-containing metal substrate. Here, also, this is not subject to any relevant restrictions. Basically, it can be a substrate of metallic aluminium. Other elements can be included for the formation of an alloy. Typical aluminium alloys are, for example, AlFe1.5 Mn0.5 or AlMg3. Basically, special alloy components can be included with a view to an advantageous effect for the respective case of application, such as silicon for example.

It is of especial importance that the aluminium is either not present in the aqueous reaction dispersion, with the mentioned substoichiometric molar ratio then being 0, or else is only present in such quantities that the corresponding value is at least below 0.4. As the substoichiometric value relates to the Si/Al ratio present in the produced zeolite and this ratio may vary from 1 to 5 for the aluminium-rich aluminosilicate-zeolites, a graduated indication of the substoichiometric quotient Al/(Al+Si) is expedient. For this, corresponding figures are to be found in Table 1 following the description, from which a correlation can be seen between the aluminium substoichiometric value (Al/(Al+Si)) in the reaction dispersion and the zeolite composition (rounded figures). It has proved to be advantageous if the mentioned molar ratio lies below 0.05, especially below 0.02. It can be especially preferable, if the substoichiometric molar ratio is 0, if the aqueous reaction dispersion does not directly contain any Al source.

This substoichiometric value requirement is to be explained technologically as follows. Hereby, an in situ direct crystallization of the said layer occurs onto the aluminium-containing metal substrate. This direct crystallization is an essential reason for the product of the method to display the desired characteristics, especially a good adhesion of the formed zeolite layer on the surface of the aluminium-containing metal substrate. If this substoichiometric value is 0 for example, this means that the network-forming aluminium for formation of the direct crystallized zeolite layer is extracted solely from the aluminium-containing metal substrate. Here, the elemental aluminium is oxidized to $Al^{3+}$ and in the aqueous reaction medium hydrogen is formed here in an equivalent manner. The $Al^{3+}$ is then present primarily with $(OH)^-$ as counterion in the region of the substrate surface and can further react there. This leads to the especially good anchoring between the surface of the aluminium-containing substrate and the formed aluminosilicate-zeolite. WO 2006/084211 A has dealt in a very detailed manner with the mentioned substoichiometric molar ratio, which has already been mentioned above and to which reference is to be made.

In realizing the method teaching according to the invention, it is of especial importance in the selection of the necessary or respectively preferred conditions to pay especial attention that the aluminium-containing substrate is not subject to any destructive decomposition, in order to achieve the success which is aimed for in accordance with the invention. Especially, it is important here that the substrate, after completion of the method, still satisfies the requirements which are set in subsequent applications. Thus, it should continue to have the necessary mechanical stability or respectively the desired integrity in its shaping.

As shown, the aqueous reaction dispersion which is used contains a Si source. No relevant restrictions are provided here. It is preferably silicic acid, silicates and/or silicic acid esters. For the case where, for the practical carrying out of the method according to the invention, an Al source is added into the aqueous reaction dispersion, taking into account the mentioned requirements, it is advantageous if this is an aluminium oxide hydrate, especially pseudoboehmite, and/or aluminium aluminate.

In carrying out the method according to the invention, the existing aqueous reaction dispersion is alkalinized, because otherwise the layer of an aluminium-rich metallic aluminosilicate-zeolite is not produced. The man skilled in the art is largely free as to how he alkalinizes the pH value of the aqueous reaction dispersion. This can be, especially, sodium hydroxide, potassium hydroxide, amines, basic Na salts and/or sodium aluminate. It is preferred that the pH value of the aqueous reaction dispersion is set at more than 9 and/or less than 13.8, especially in alloys with an Al content of more than 90%.

In individual cases, it is advantageous that colloidal sources of the silicon and/or of the aluminium are used. It can be expedient here to add fluoride salts or hydrofluoric acid for the mineralization thereof, wherein it must be taken into consideration that the aqueous reaction dispersion must have a pH value of more than 7.

Furthermore, it can be advantageous if the aqueous reaction dispersion contains an organic template or respectively an organic agent directing the structure, this being especially amines or respectively ammonium salts or crown ethers. The function of such substances is known. They are also designated in the literature inter alia as "template molecule" (cf. Stephen G. Wilson, "*Templating in Molecular Sieve Synthesis*" (from Elsevier Science P. V.)).

In individual cases, it can be preferred to accelerate the crystallization in the formation of the layer of the aluminium-rich aluminosilicate-zeolite when carrying out the method according to the invention. This is especially advantageous when the reaction dispersion which being used has a high agressivity with respect to the aluminium-containing substrate. In this case it is expedient, in order to obtain a closed zeolite layer more quickly, to add seed crystals or an aged gel. An aged gel is a reaction dispersion which is enabled to form the respective target zeolite of the layer in powder form and which, after several hours at room temperature is already in the nucleation phase of zeolite development without, however, reaching the zeolite growth phase. The high viscosity of the gel in addition allows the seed crystals to be applied directly onto the aluminium-containing metal substrate.

The method according to the invention is preferably carried out at a raised temperature. It is expedient that the aqueous reaction dispersion and the aluminium-containing metal substrate situated therein are heated to a temperature of 50 to 200° C., especially from 70 to 130° C. For the case where the temperature of 100° C. is exceeded, it can be necessary to carry out the reaction in a closed system, accordingly in an autoclave.

The inventors have identified that it is especially expedient for an advantageous carrying out of the method according to the invention to pay attention to the ratio of the surface of the aluminium-containing substrate to the volume of the aqueous reaction dispersion (in $cm^2/cm^3$). It proves to be preferred if this ratio is set at 0.03 to 20, especially at 0.1 to 15 and quite especially preferably at 1 to 8. If it is less than 0.1, especially less than 0.03, then too much aqueous reaction dispersion is available, which can have a destructive effect on the aluminium-containing metal substrate. In addition, it was shown that too great a volume over the aluminium-containing substrate reduces the layer growth in favour of the undesired crystal growth in the reaction dispersion. If the value of 15, especially of 20 is exceeded, then not enough reactants are available for a sufficient covering of the aluminium-containing substrate with aluminosilicate-zeolite crystals.

The question could be raised as to how thick the zeolite layer is which is formed according to the invention on the aluminium-containing metal substrate. The subsequent application of the obtained product is determinative for this. The invention shows great flexibility here. In its embodiment, the layer thickness can be set in a desirable manner and for example can be approximately 5 to 50 µm. For the formation of especially thick coatings, it is expedient to continue the layer growth with fresh aqueous reaction dispersion.

After the direct crystallization of the aluminium-rich aluminosilicate-zeolite onto the aluminium-containing metal substrate, it is merely necessary to remove the coated substrate from the remaining reaction dispersion. Advantageously, remaining reaction dispersion is removed from the coated substrate by washing. For the case where the method according to the invention uses an organic agent directing the structure or respectively an organic template, the possibility exists to further remove this agent or respectively template by a calcination, if applicable after washing.

The method according to the invention was described in detail above. The product which is obtained thereafter in the form of the aluminium-containing metal substrate coated with aluminosilicate-zeolite is novel and is not disclosed in the described prior art. Consequently, the invention is also directed to a zeolite-coated aluminium-containing metal substrate which has a layer of an aluminium-rich aluminosilicate-zeolite with a Si/Al ratio of less than 5, especially of less than 4, wherein it is quite especially preferred if the value is less than 3.5. The above explanations concerning this ratio apply here accordingly. The same applies for the nature of the aluminium-rich aluminosilicate-zeolites which are preferred for the invention. The indicated values apply to zeolites in synthesis form without subsequent treatments.

The aluminium-containing metal substrates coated with aluminosilicate-zeolite which are obtained according to the invention are available for a variety of applications, preferably in sorption-based application fields, especially for heterogeneous catalysis, in separation and cleaning processes, in sorption heat pumps, in conjunction with immobilized catalysis and in microreaction technology. This list is not restrictive.

In summary, the advantages which can be achieved with the present invention compared with the prior art can be presented as follows: 1. Thin, hydrophilic aluminosilicate-zeolite layers on aluminium-containing metal substrates are accessible, wherein Al-rich aluminosilicates are present. These carry more lattice charge and are therefore distinctly more hydrophilic than Al-poor zeolites. 2. Conventional adsorption agents, such as FAU, are able to be produced for the first time as compact layers with secure, direct binding on metallic aluminium (very good heat conduction). 3. The method according to the invention is a one-step synthesis, wherein no foreign zeolite layer is necessary as binding matrix. 4. Several of the aluminosilicate-zeolites which are to be taken into consideration according to the invention are accessible without a template and therefore without calcination. 5. A layer of an aluminium-rich aluminosilicate-zeolite is formed very securely on a metallic Al carrier.

With the aid of the above presentation of the method according to the invention, especially taking into consideration the illustrative embodiments, and taking into consideration the following explanatory examples, the specialist in the art is able, without difficulty, to successfully carry out the invention.

TABLE 1

Examples regarding the dependence of the aluminium substoichiometric value Al/(Al + Si) in the reaction dispersion on the zeolite composition (rounded figures)

| Ratio in the zeolite Si/Al | Without substoichiometric value 100% of theoret. Al-component Al/(Al + Si) | Substoichiometric value | | |
|---|---|---|---|---|
| | | 80% of theoret. Al-component Al/(Al + Si) | 10% of theoret. Al-component Al/(Al + Si) | 0% of theoretical Al-component Al/(Al + Si) |
| 1.00 | 0.50 | 0.40 | 0.05 | 0 |
| 2.00 | 0.33 | 0.27 | 0.03 | 0 |

TABLE 1-continued

Examples regarding the dependence of the aluminium substoichiometric value Al/(Al + Si) in the reaction dispersion on the zeolite composition (rounded figures)

| Ratio in the zeolite Si/Al | Without substoichiometric value 100% of theoret. Al-component Al/(Al + Si) | Substoichiometric value | | |
|---|---|---|---|---|
| | | 80% of theoret. Al-component Al/(Al + Si) | 10% of theoret. Al-component Al/(Al + Si) | 0% of theoretical Al-component Al/(Al + Si) |
| 3.00 | 0.25 | 0.20 | 0.03 | 0 |
| 4.00 | 0.20 | 0.16 | 0.02 | 0 |
| 5.00 | 0.17 | 0.13 | 0.02 | 0 |

EXAMPLE 1

Batch Preparation

The reaction batch was produced starting from two solutions.

Solution A:

6 g sodium metasilicate pentahydrate ($Na_2O_3Si \cdot 5H_2O$, of the company Aldrich) were added under stirring to 70 g $H_2O$ and stirred together until a clear solution was obtained. 42.35 g triethanolamine ($C_6H_{15}NO_3$, ≥99%, of the company Carl Roth GmbH) were then added to the solution and stirred for approximately 30 minutes.

Solution B:

0.78 g NaOH (≥99%, of the company Carl Roth GmbH) were mixed with 49.34 g $H_2O$. The mixture was stirred until a clear solution was obtained. Solution B was added under stirring to solution A and homogenized for approximately 30 minutes. The resulting reaction batch had a pH value of 13.1 and the following composition in oxide ratios: 1.0 $SiO_2$:1.2 $Na_2O$:5.9 $C_6H_{15}NO_3$:140 $H_2O$.

Synthesis

The aluminium carriers were cleaned with acetone, dried, placed in stainless steel autoclaves and covered with the synthesis solution. The autoclaves were closed and heated for a) 96 h (Example 1a) or respectively b) 163 h (Example 1b) in a circulating air oven to 95° C. Thereafter, the autoclaves were removed from the oven, cooled and opened. The aluminium carriers were removed, cleaned with deionised water and dried at room temperature.

Analyses

The hydrothermally treated aluminium carriers were analyzed by means of X-ray powder diffractometry (XRD), scanning electron microscopy (SEM) and energy-dispersive X-ray spectroscopy (EDX). The figures show the following here:

EXAMPLE 2

Batch Preparation

The reaction batch was produced from two solutions.

Solution A:

7.5 g sodium waterglass (25.5 to 28.5% $SiO_2$, of the company AppliChem GmbH) were added under stirring to 75 g $H_2O$ and stirred together until a clear solution was obtained. 10.29 g triethanolamine ($C_6H_{15}NO_3$, ≤9%, of the company Carl Roth GmbH) were then added to the solution. Homogenizing was carried out for approximately 30 minutes.

Solution B:

1.03 g NaOH (≥99%, of the company Carl Roth GmbH) were added to 30.52 g $H_2O$ and stirred together until a clear solution was obtained. Solution B was added under stirring to solution A. Homogenizing was carried out for approximately 30 minutes. The resulting reaction batch had a pH value of 12.7 and the following composition in oxide ratios: 1.0 $SiO_2$: 0.66 $Na_2O$:2.0 $C_6H_{15}NO_3$:180 $H_2O$.

Synthesis

The hydrothermal synthesis was carried out as described in Example 1.

Analyses

Figure 1:
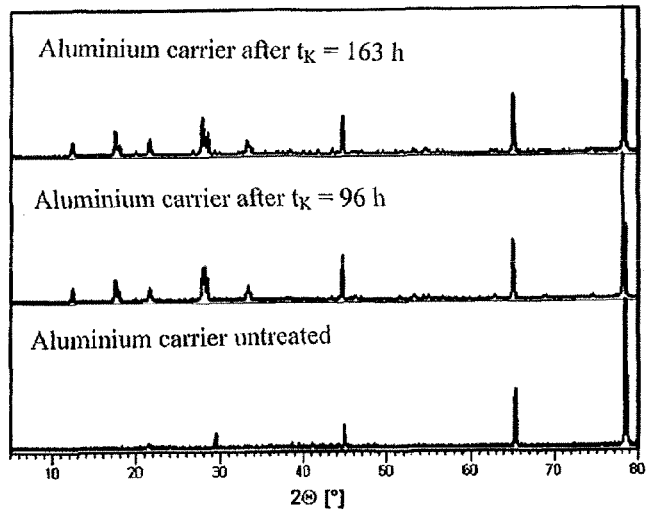
FIG. 1a shows the X-ray diffractograms of the untreated aluminium carrier and of the aluminium carriers treated for 96 h and 163 h. In addition to the aluminium reflexes, the diffractograms of the hydrothermally treated carriers show peaks of the gismondite (GIS)-zeolite structure.
FIG. 1b shows the comparison of the reflexes of the product after 163 h with zeolite P2, ICDD Data Bank, PDF Number 80-0700, FIG. 2a SEM micrographs of the crystal layers in top view and FIG. 2b in cross-section and FIG. 2c the EDX analysis of the crystal layer, wherein a Si/Al ratio of 2.3 was determined.
Figure 1:
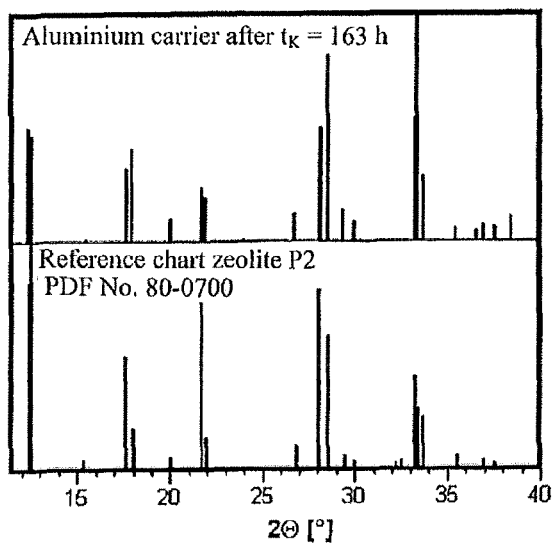
Figure 2A:
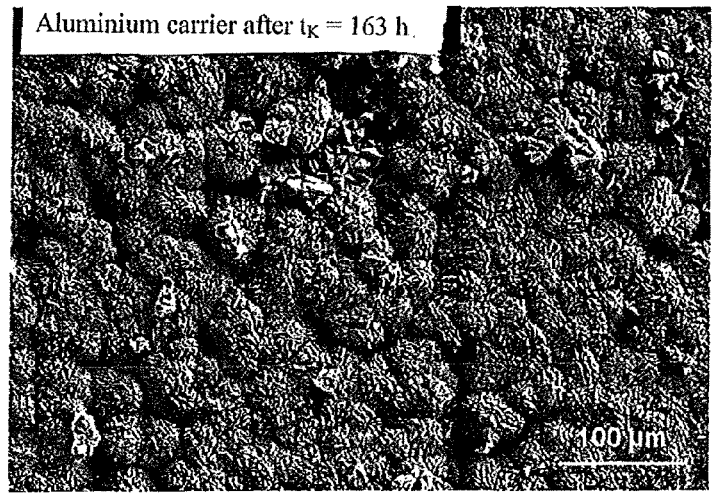
Figure 2B:
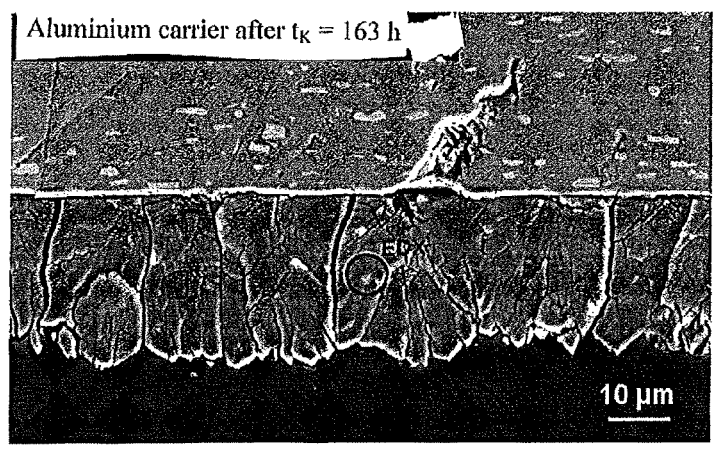
Figure 2C:
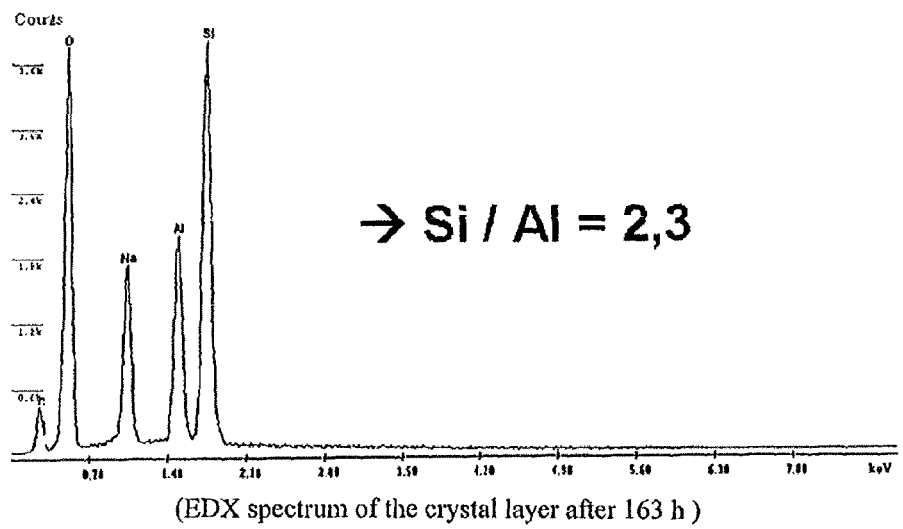
Figure 3A:
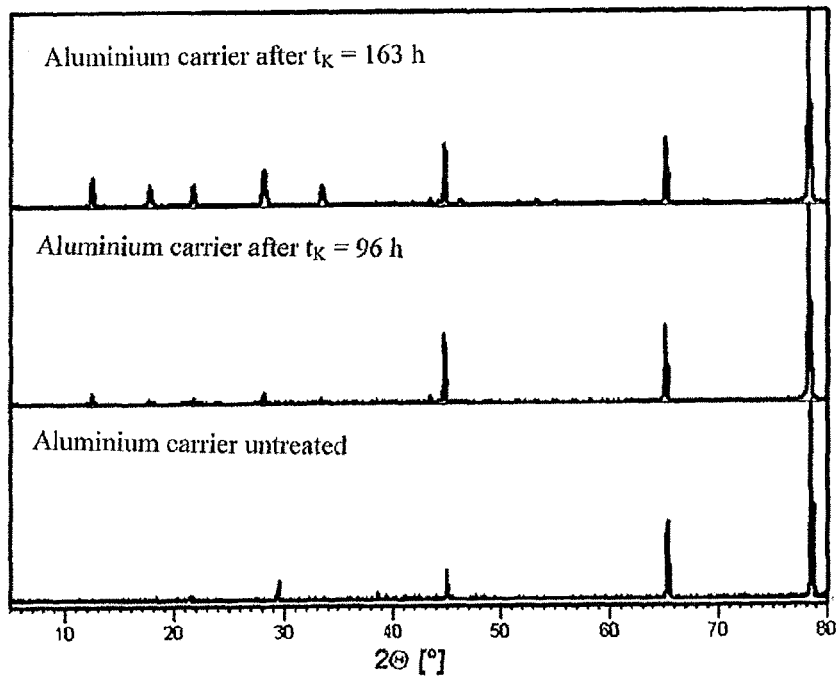

The hydrothermally treated aluminium carriers were analyzed by means of X-ray powder diffractometry (XRD), scanning electron microscopy (SEM) and energy-dispersive X-ray spectroscopy (EDX). The figures show the following here:

FIG. 3a shows the X-ray diffractograms of the untreated aluminium carrier and of the aluminium carriers treated for 96 h and 163 h. In addition to the aluminium reflexes, the diffractograms of the hydrothermally treated carriers show peaks of the gismondite (GIS)-zeolite structure.

Figure 3B:
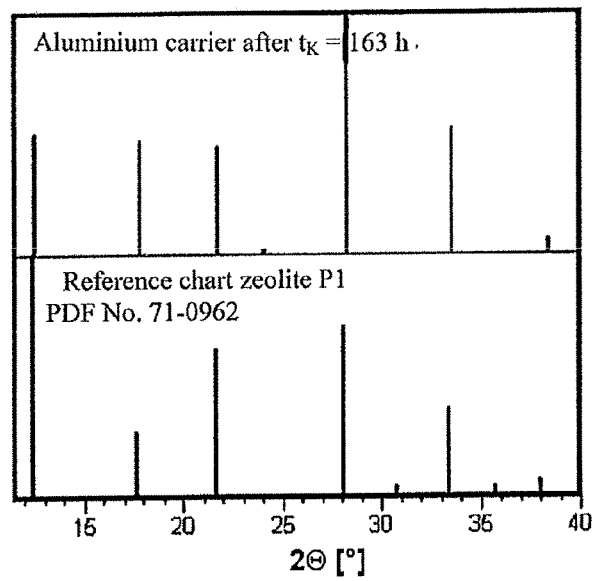
Figure 4A:
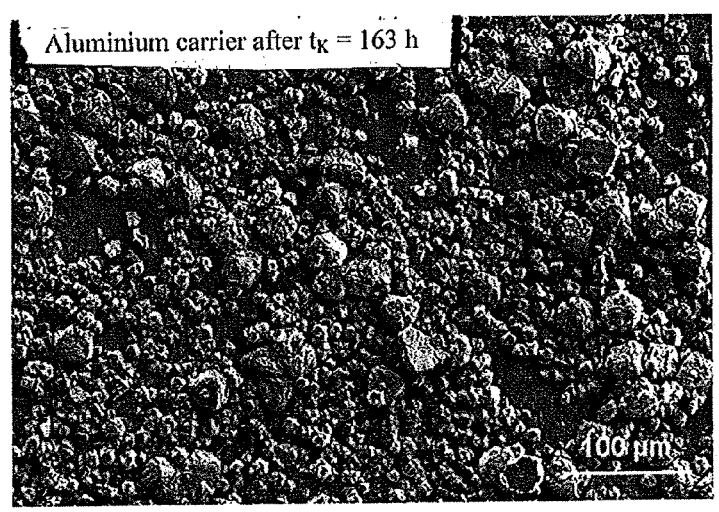
Figure 4B:
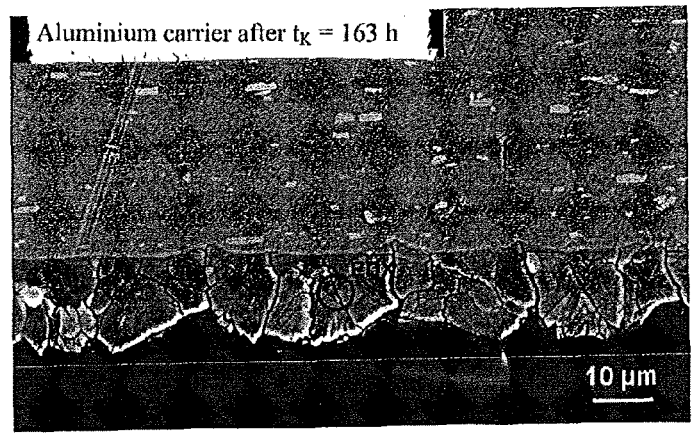
Figure 4C:
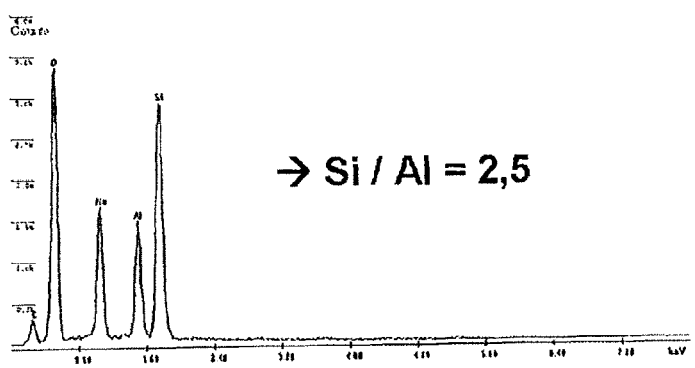

FIG. 3b shows the comparison of the reflexes of the product after 163 h with zeolite P1, ICDD Data Bank, PDF Number 71-0962, FIG. 4a SEM micrographs of the crystal layers in top view and FIG. 4b in cross-section and FIG. 4c the EDX analysis of the crystal layer. Here, a Si/Al ratio of 2.5 was determined.

The invention claimed is:

1. A method for forming an aluminosilicate-zeolite layer on an aluminium-containing metal substrate comprising the steps of:

transferring the aluminium-containing metal substrate into an aqueous reaction dispersion containing a silicon source and an aluminium source as network-forming elements, wherein, a molar substoichiometric ratio of the aluminium source in the aqueous reaction dispersion to the sum of the silicon source and aluminum source as network-forming elements contained in the aqueous reaction dispersion ranges from 0.02 to about 0.4, heating the aqueous reaction dispersion containing the aluminium-containing metal substrate to thereby extract aluminium from the aluminium-containing metal substrate, and performing in situ direct crystallization to thereby form a layer of an aluminium-rich aluminosilicate-zeolite directly onto the aluminium-containing metal substrate, said layer of an aluminium-rich aluminosilicate-zeolite having an Si/Al ratio of less than 5 wherein the aqueous reaction dispersion contains the silicon source in an amount sufficient for forming the Si/Al ratio of less than 5, and the aluminum source in an amount to satisfy the molar substoichiometric ratio, wherein the pH value of the aqueous reaction dispersion is alkalinized.

2. A method according to claim 1, wherein the aluminum source is selected from the group consisting of aluminium oxide hydrate, pseudoboehmite, sodium aluminate and combinations thereof, and wherein the optional aluminum source is used in addition to the aluminium contained in the aluminium-containing metal substrate.

3. A method according to claim 1, wherein the silicon source is selected from the group consisting of silicic acid, silicates, silicic acid esters and combinations thereof.

4. A method according to claim 1, wherein said aqueous reaction dispersion further comprises an alkaline source selected from the group consisting of: sodium hydroxide, potassium hydroxide, amines, basic Na salts, sodium aluminate and combinations thereof.

5. A method according to claim 1, wherein the pH value of the aqueous reaction dispersion is set at more than 9 and/or less than 13.8, and wherein said aluminium-containing metal substrate is an Al alloys with an Al content of more than 90%.

6. A method according to claim 1, wherein the ratio of a surface of the aluminium-containing metal substrate to a volume of the aqueous reaction dispersion (in $cm^2/cm^3$) is set between 0.03 and 20.

7. A method according to claim 1, wherein aluminium-rich aluminosilicate-zeolites are formed, in which the Si/Al ratio is smaller than 4.

8. A method according to claim 1, wherein a layer of an aluminium-rich aluminosilicate-zeolite in the form of LTA, FAU, CHA, MOR or GIS is formed on the aluminium-containing metal substrate.

9. A method according to claim 1, wherein the molar ratio of the aluminium present in molar substoichiometric ratio, in the aqueous reaction dispersion, to the sum of the silicon and aluminium network-forming elements contained in the aqueous reaction dispersion lies below 0.05.

10. A method according to claim 1, wherein the aqueous reaction dispersion contains an organic template or a structure directing organic agent.

11. A method according to claim 10, wherein the structure directing organic agent is selected from the group consisting of amines, ammonium salts and crown ethers.

12. A method according to claim 1, wherein when one or more of the silicon source and aluminum source is colloidal, adding fluoride salts or hydrofluoric acid to the aqueous reaction dispersion for the mineralization thereof.

13. A method according to claim 1, wherein the aqueous reaction dispersion and the aluminium-containing metal substrate situated therein are heated to a temperature of 50 to 200° C.

14. A method according to claim 1, further comprising adding one or more of seed crystals and aged gel to the aqueous reaction dispersion to thereby accelerate the crystallization in the formation of the layer of the aluminium-rich aluminosilicate-zeolite.

15. The method according to claim 1, wherein the molar ratio of the aluminum present in molar substoichiometric ratio to the sum of the silicon and aluminum network-forming elements contained in the aqueous reaction dispersion is 0.02.

16. The method according to claim 1, wherein the molar ratio of the aluminum present in molar substoichiometric ratio to the sum of the silicon and aluminum network-forming elements contained in the aqueous reaction dispersion is 0.16.

17. The method according to claim 1, wherein the molar ratio of the aluminum present in molar substoichiometric ratio to the sum of the silicon and aluminum network-forming elements contained in the aqueous reaction dispersion is 0.20.

18. The method according to claim 1, wherein the molar ratio of the aluminum present in molar substoichiometric ratio to the sum of the silicon and aluminum network-forming elements contained in the aqueous reaction dispersion is 0.27.

* * * * *